April 3, 1962 H. B. SPEER, JR 3,027,926
PNEUMATIC TIRE ASSEMBLY
Filed July 18, 1960
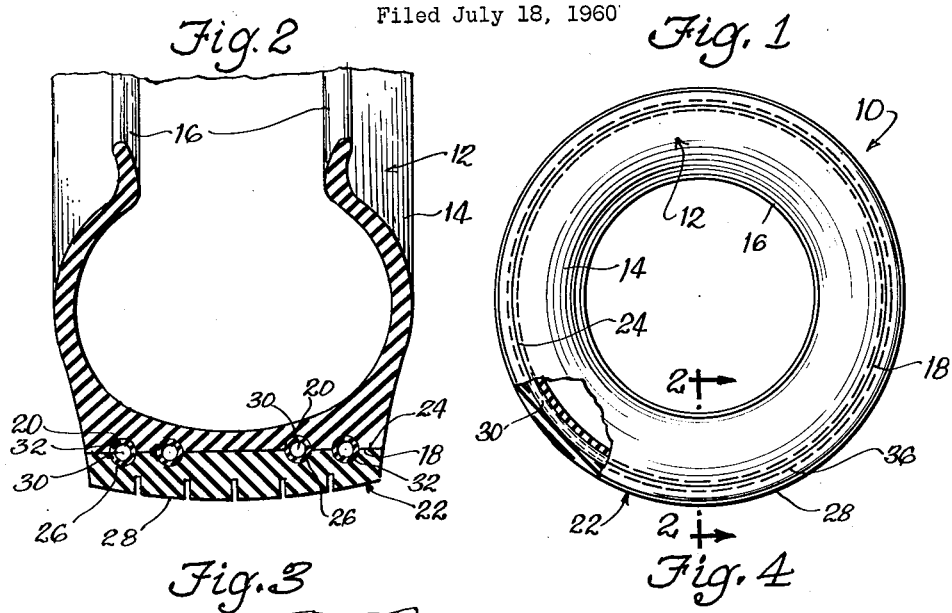
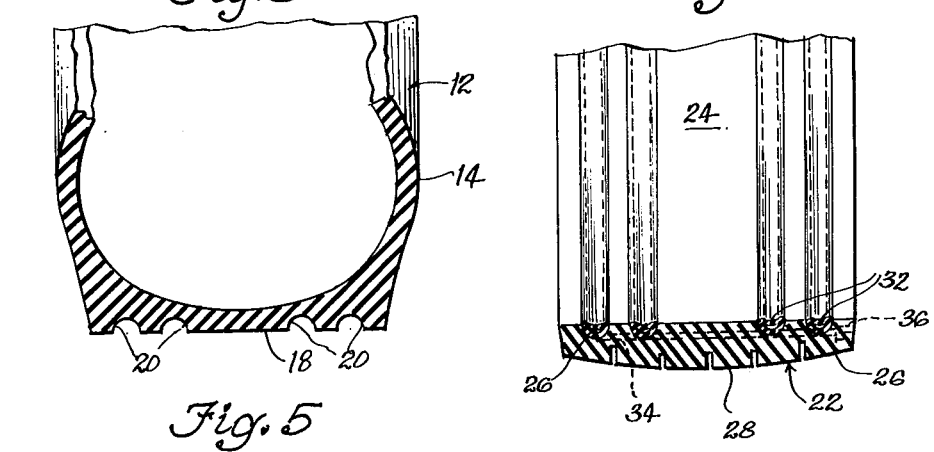
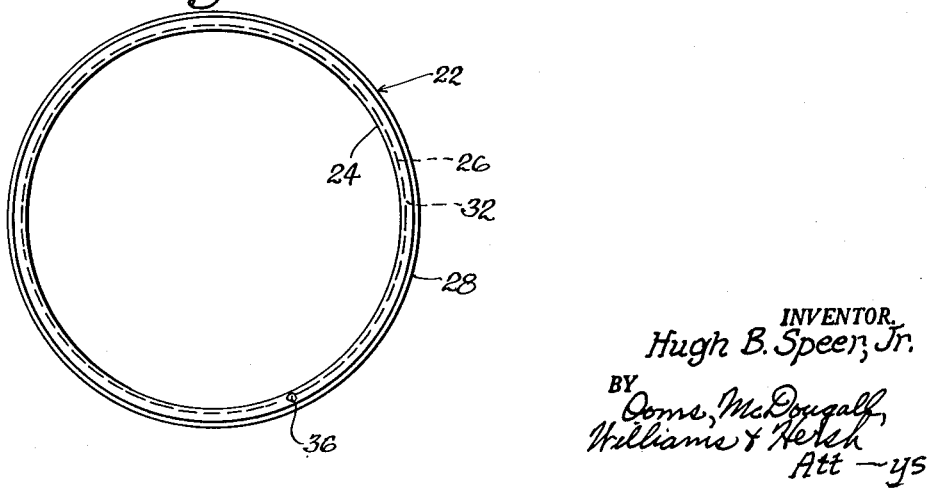
INVENTOR.
Hugh B. Speer, Jr.
BY Dome, McDougall,
Williams & Hersh
United States Patent Office 3,027,926
Patented Apr. 3, 1962

3,027,926
PNEUMATIC TIRE ASSEMBLY
Hugh B. Speer, Jr., 2948 North Bend Road,
Cincinnati, Ohio
Filed July 18, 1960, Ser. No. 43,674
5 Claims. (Cl. 152—187)

This invention relates to a pneumatic tire assembly wherein the tread of such assembly may be removed from the tire and replaced.

Tires of the type used on such vehicles as automobiles, trucks, tractors, and the like when subjected to prolonged and hard usage eventually wear away at the tread portions thereof, necessitating the tires to be recapped or replaced by new tires. In many instances, the carcass of such tread-worn tires are in sound condition and would be capable of further use if it were possible to replace the worn tread.

While recapping of usable carcass has been practiced for a number of years, the practices of the tire industry usually require that the owner of a tire having worn tread exchange the tire for a set of recapped tires with the original worn tire being taken to an establishment for recapping where it is sold as replacement for other worn tires. Since retreading requires expensive machinery, equipment and know-how, it is not possible for the average individual to conveniently retread tires having worn treads.

If it were possible to simply replace worn treads on automobile tires utilizing simple tools, it would be possible for the average owner of vehicles to replace worn tires at a cost far below the cost of either having the worn tires recapped or replacing worn tires with new tires.

When vehicles, such as automobiles, are driven at high speed and then subjected to rapid braking action, the tread of conventional tires, being integrally formed with the carcass, causes undue heat and frictional shock to be transmitted from the tread to the carcass. It would be a valuable contribution towards prolonging the life of tires, as well as improving their safety characteristics, to provide a tire having a tread which was capable of independent flexure or movement under conditions of rapid stopping at high speeds whereby the tread would receive the major portion of the shock without such being transmitted to the entire tire.

It therefore becomes an object of this invention to provide a tire which has a replaceable tread.

A further object is to provide a tire assembly having replaceable tread element which may be simply installed without necessitating the use of complicated tools or equipment.

A further object is to provide a tire having a tread which under conditions of rapid stopping at high speeds will be capable of movement and flexure independent of the movement and flexure of the carcass.

Other objects will appear hereinafter.

For a further understanding of the invention, reference may be had to the attached drawings where like parts are shown by like numerals and in which:

FIGURE 1 is an elevational side view broken away in part, showing a tire assembly of the invention;

FIGURE 2 is taken across the line 2—2 of FIGURE 1;

FIGURE 3 is a cross-sectional, perspective front view of a carcass used in the practices of the invention;

FIGURE 4 is a cross-sectional, perspective front view of a replaceable tread used in the practices of the invention; and FIGURE 5 is an elevational side view of a replaceable tread member of the invention.

As shown in FIGURE 1, this invention consists of a pneumatic tire assembly 10 of conventional appearance which is composed of a carcass 12 formed to have side walls 14, beads 16 and a radially outwardly facing carcass surface 18 which forms the outer periphery of the carcass. Formed within the outer periphery of the radially outwardly facing carcass surface are grooves 20 which are shown to best advantage in FIGURE 3. These grooves, in a preferred embodiment of the invention, extend longitudinally in a parallel spaced apart relationship around the entire periphery of the radially outwardly facing carcass 18.

The removable or replaceable tread element of this invention is shown in FIGURE 5 generally by the numeral 22. The tread contains about its inner periphery 24 a series of longitudinal, parallel spaced apart grooves 26 with the outer periphery of the tread being formed as tread structures 28. The tread member is constructed to fit over the carcass member so that when positioned, as shown in FIGURE 2, the grooves 20 and 28 form a continuous channel 30.

To maintain the tread in a relatively fixed position in relationship to the carcass, there is positioned within the channels 30 a resilient, inflatable conduit shown by the numeral 32. This resilient, inflatable conduit is preferably made of a material which is similar in its physical and chemical characteristics to the flexible material used to form both the carcass and the tread with resilient substances, such as natural and/or synthetic rubbers and plastics, being contemplated.

In operation, the resilient, inflatable conduits 32 which fit within the channels 30 are inflated by means of a suitable valve represented in the drawings by the numeral 36 to provide a tight-fitting relationship between the outer surfaces of the resilient, inflatable tubular conduits and the inner circumference of the channels 30.

In order to maintain a uniform pressure within the flexible, inflatable conduits 32, provision is also made for an interconnecting crosswise-extending conduit 34 which connects the resilient, inflatable conduits 32 whereby equalization of air pressure within the flexible conduits 32 may be maintained. In a preferred embodiment, the interconnecting tubular conduit 34 is resilient and is connected to the valve member 36.

The feature of interconnecting the resilient, inflatable tubular conduits 32 by an interconnecting resilient conduit 34 is shown to best advantage in FIGURE 4.

FIGURE 4 also demonstrates a specific embodiment of the invention in which the resilient, inflatable tubular conduits 32 are fastened by such means as gluing within the grooves 26 of the tread to provide a tread assembly which may be placed on the carcass and then inflated to effect a sealing and fitting relationship between the tread assembly and the carcass.

The rubber valve 36 is most preferably of the type commonly found in athletic equipment such as football, basketball and the like which are open to allow the admission of air by means of a fine, hollow needle which is threaded to receive a conventional discharge line from a hand or compressor driven pump.

While several embodiments of the invention have been shown generally by the drawings and the previous description, it will be understood that several modifications may be made without departing from the spirit hereof.

The tire assembly presented by the invention has several advantages over prior art tires conventionally used on various types of land-driven vehicles. In the first instance, they provide an economical solution to the replacement of tires wherein the tread becomes worn whereas the carcass still has sufficient strength and rigidity to be capable of use for a much longer period of time. Since the tread assembly is made of a resilient material such as rubber, it is possible to easily remove it from or place it on the carcass surface 18 using simple tools such as tire irons or other simple leverage type devices once the air pressure has been removed from the resilient, inflatable tubular conduits.

An important advantage of the invention is that under conditions of quick stops under high speed, the tread will tend to move independently of the casing, thereby tending to remove a great deal of the shock and twisting from this element, hence substantially improving and lengthening its useful life.

The replaceable tread elements of the invention being substantially smaller in dimension than a conventional tire, it is possible to store as many as three or four such assemblies in a limited space, such as the trunk compartment of a commercial passenger automobile, without substantially diminishing the storage area of such trunk space.

Having thus described my invention, what I claim is:

1. A tire assembly of the type comprising a carcass having side walls and a radially outwardly facing surface, a plurality of semi-circular parallel grooves longitudinally extending continuously about the outer periphery of said carcass, a replaceable tread member for placement about the carcass having within its inner periphery a plurality of semi-circular longitudinally, continuously extending grooves with the grooves in the carcass and in the tread member, when placed in juxtaposition, forming a circular passageway, a plurality of resilient inflatable conduits for inflatably fitting within the circular passageway, inflatable means interconnecting the inflatable conduits and valve means for inflating said resilient inflatable conduits.

2. The tire assembly of claim 1 where the valve means for inflating the resilient inflatable conduits extends through the side of the tire assembly near the removable tread.

3. The tire assembly of claim 1 where the inflatable means interconnecting the resilient inflatable conduit are resilient inflatable conduits extending crosswise to the resilient inflatable conduits and are connected to the valve means.

4. The tire assembly of claim 1 where the resilient inflatable conduits and the crosswise extending interconnecting resilient conduits are fixed within the periphery of the tread member.

5. A tire assembly comprising a carcass having side walls and a radially outwardly facing surface therebetween, a replaceable tread member, a plurality of semi-circular grooves longitudinally extending continuously about the respective outer and inner peripheries of the radially outwardly facing surface of the carcass and the replaceable tread, and a plurality of inflatably interconnected resilient tubular conduits extending through said semi-circular grooves to engage the aligned groove portions of the carcass and tread assembly.

References Cited in the file of this patent

UNITED STATES PATENTS

| | | |
|---|---|---|
| 1,053,953 | Ascheri | Feb. 15, 1913 |
| 1,080,821 | Forster | Dec. 9, 1913 |
| 1,163,311 | Bernstein | Dec. 7, 1915 |
| 2,708,470 | Gramelspacher | May 17, 1955 |